United States Patent
Yang (10) Patent No.: US 9,740,257 B2
(45) Date of Patent: Aug. 22, 2017

(54) WIRELESS COMMUNICATION SYSTEM AND NETWORK ATTACHED STORAGE DEVICE THEREOF

(71) Applicant: ScienBiziP Consulting (Shen Zhen)Co., Ltd., Shenzhen (CN)

(72) Inventor: Meng-Liang Yang, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 55 days.

(21) Appl. No.: 14/794,402

(22) Filed: Jul. 8, 2015

(65) Prior Publication Data

US 2016/0349815 A1    Dec. 1, 2016

(30) Foreign Application Priority Data

May 28, 2015 (CN) .......................... 2015 1 0278992

(51) Int. Cl.
  *G06F 1/26* (2006.01)
  *H04W 52/02* (2009.01)
  *H04L 29/08* (2006.01)

(52) U.S. Cl.
  CPC .............. *G06F 1/266* (2013.01); *G06F 1/263* (2013.01); *H04L 67/1097* (2013.01); *H04W 52/0209* (2013.01)

(58) Field of Classification Search
  CPC .... G06F 1/3203; G06F 1/3221; G06F 1/3228; G06F 1/3268; G06F 3/0689; G06F 1/263; G06F 1/266; G08B 25/10; H04L 67/1097; H04W 52/0209
  See application file for complete search history.

(56) References Cited

U.S. PATENT DOCUMENTS

| | | | |
|---|---|---|---|
| 2002/0065618 A1* | 5/2002 | Oh ......................... | G06F 1/3203 702/57 |
| 2007/0006001 A1* | 1/2007 | Isobe .................... | G06F 1/3221 713/300 |
| 2007/0168046 A1* | 7/2007 | Misawa .................... | G06F 3/14 700/1 |
| 2008/0160937 A1* | 7/2008 | Baker .................... | G07C 5/085 455/127.5 |
| 2009/0140691 A1* | 6/2009 | Jung ....................... | H02J 7/025 320/108 |
| 2010/0106989 A1* | 4/2010 | Chen ..................... | G06F 1/3228 713/322 |

(Continued)

*Primary Examiner* — Jaweed A Abbaszadeh
*Assistant Examiner* — Terrell Johnson
(74) *Attorney, Agent, or Firm* — Steven Reiss (57) ABSTRACT

A network attached storage (NAS) device includes a control unit, a wireless communication unit, a switch unit, a voltage conversion circuit, a battery unit, and a storage unit. When the wireless communication unit receives a request to access the storage unit, the wireless communication unit outputs a first control signal to activate the switch unit, the battery unit powers the voltage conversion circuit through the switch unit, and the voltage conversion circuit supplies power to the control unit and the storage unit. Until the wireless communication unit receives the request, the wireless communication unit outputs a second control signal to deactivate the switch unit, the battery unit cannot power the voltage conversion circuit through the switch unit, and the voltage conversion circuit does not supply power the control unit and the storage unit.

10 Claims, 5 Drawing Sheets

(56) References Cited

U.S. PATENT DOCUMENTS

2010/0277957 A1* 11/2010 Chueh .............. H02M 3/33569
    363/21.07
2015/0022344 A1* 1/2015 Matsuoka ............ G08B 25/001
    340/523

* cited by examiner

WIRELESS COMMUNICATION SYSTEM AND NETWORK ATTACHED STORAGE DEVICE THEREOF

FIELD

The subject matter herein generally relates to wireless communications.

BACKGROUND

Even if data is not being written to or read from a storage unit of a network attached storage device, the storage unit maintains power and consumes electrical energy.

BRIEF DESCRIPTION OF THE DRAWINGS

Implementations of the present technology will now be described, by way of examples only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 1:
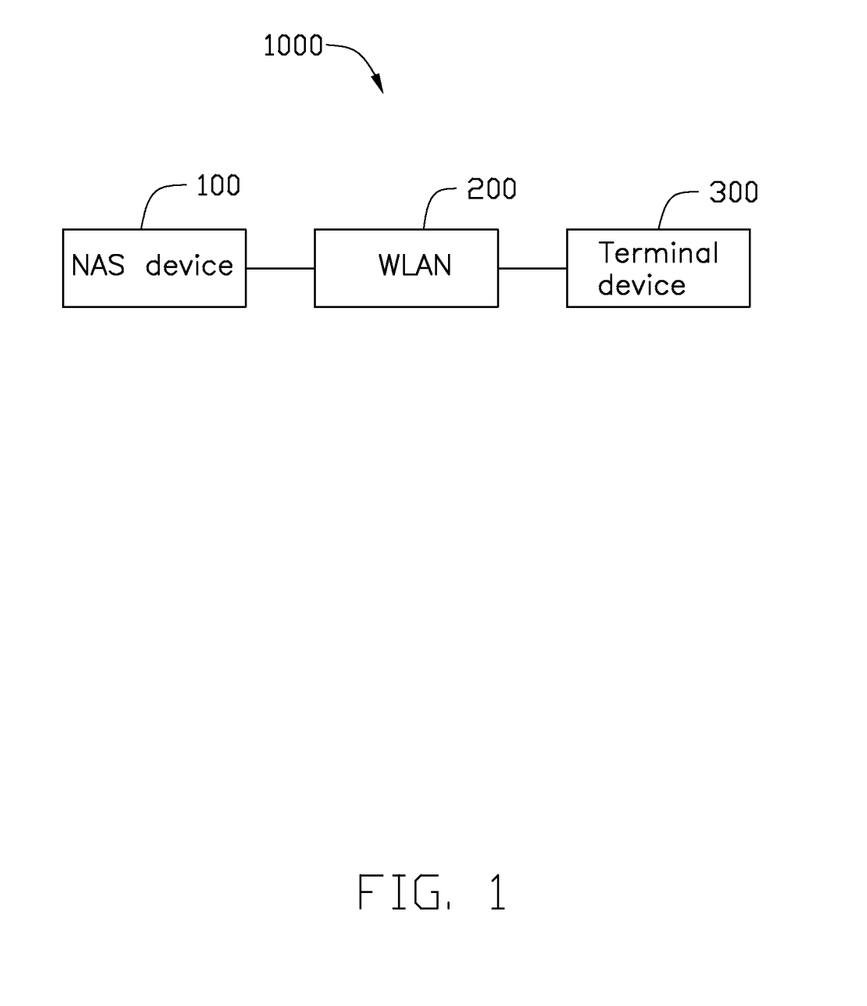
FIG. 1 is a block diagram of an embodiment of a wireless communication system, the wireless communication system comprising a network attached storage (NAS) device.

FIG. 1 illustrates an embodiment of a wireless communication system 1000. The wireless communication system 1000 can comprise a network attached storage (NAS) device 100, a wireless local area network (WLAN) 200, and a terminal device 300. The NAS device 100 communicates with the terminal device 300 through the WLAN 200. In at least one embodiment, the terminal device 300 can be a desktop computer, a notebook computer, a mobile phone, or a digital camera.

Figure 2:
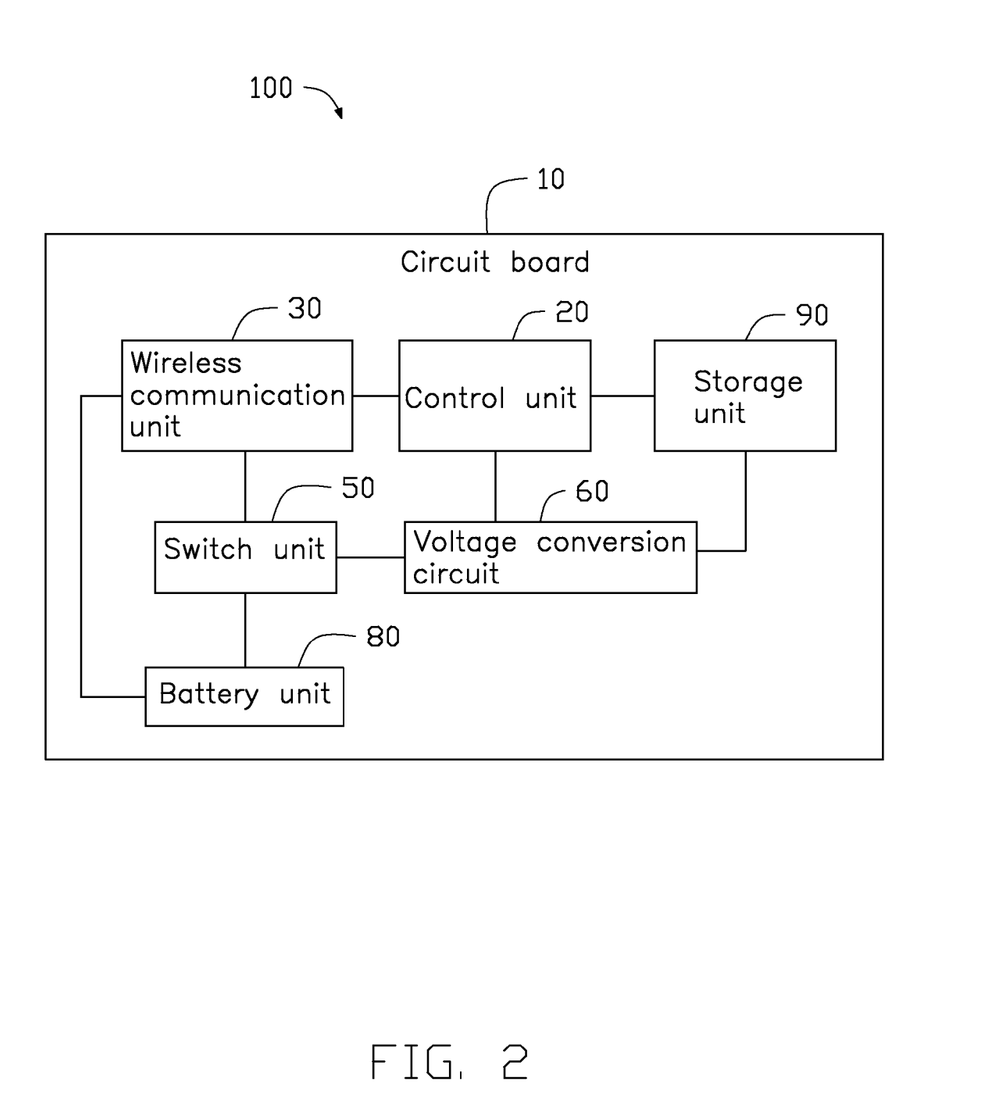
FIG. 2 is a block diagram of an embodiment of the NAS device of FIG. 1, the NAS device comprising a wireless communication unit, a storage unit, and a switch unit.

FIG. 2 illustrates an embodiment of the NAS device 100. The NAS device 100 can comprise a circuit board 10. The circuit board 10 can comprise a control unit 20, a wireless communication unit 30, a switch unit 50, a voltage conversion circuit 60, a battery unit 80, and a storage unit 90. The control unit 20 is electrically coupled to the wireless communication unit 30 and the storage unit 90. The wireless communication unit 30 is electrically coupled to the switch unit 50 and the battery unit 80. The switch unit 50 is electrically coupled to the voltage conversion circuit 60 and the battery unit 80. The voltage conversion circuit 60 is electrically coupled to the control unit 20 and the storage unit 90. In at least one embodiment, the voltage conversion circuit 60 is similar to an ordinary voltage conversion circuit, and therefore is not described in detail here.

The battery unit 80 is configured to power the wireless communication unit 30 and the switch unit 50. The storage unit 90 is configured to store data. The wireless communication unit 30 is configured to access the WLAN 200 and receive and transmit wireless signals. When the wireless communication unit 30 receives a signal as a request to access the storage unit 90 from the terminal device 300, the wireless communication unit 30 outputs a first control signal to the switch unit 50. The switch unit 50 is thus turned on, and the battery unit 80 powers the voltage conversion circuit 60 through the switch unit 50. The voltage conversion circuit 60 converts a voltage supplied by the battery unit 80 into operation voltages of the control unit 20 and the storage unit 90, to power the control unit 20 and the storage unit 90. Until the wireless communication unit 30 receives the request to access the storage unit 90, the wireless communication unit 30 outputs a second control signal to the switch unit 50. The switch unit 50 is thus turned off, the battery unit 80 cannot power the voltage conversion circuit 60 through the switch 50, and the voltage conversion circuit 60 does not supply power to the control unit 20 and the storage unit 90. Therefore, when the storage unit 90 is not accessed, the control unit 20 and the storage unit 90 are not powered, and electrical energy is saved. In at least one embodiment, the control unit 20 can comprise a NAS controller, and the battery unit 80 can comprise a plurality of rechargeable batteries.

Figure 3:
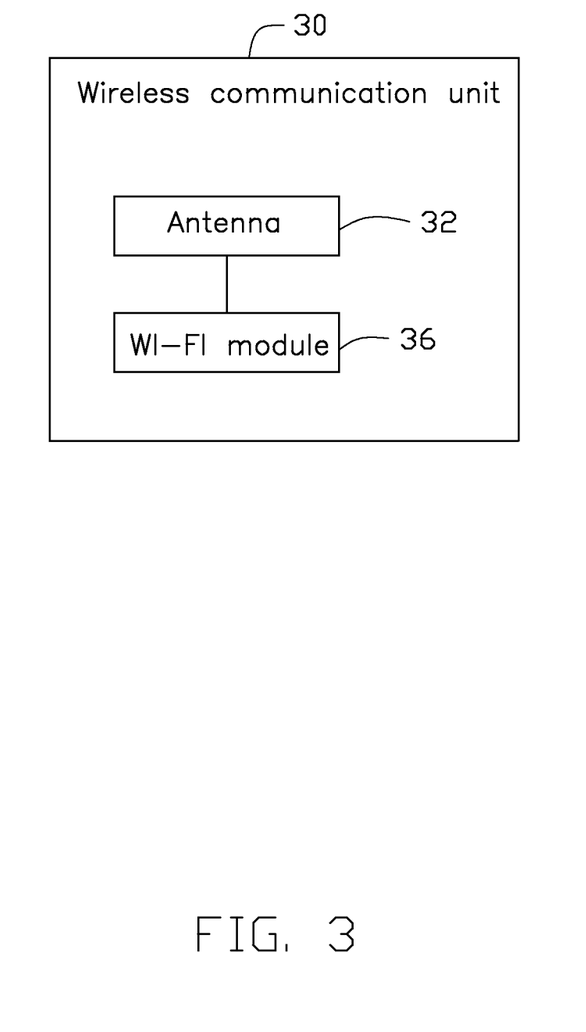
FIG. 3 is a block diagram of an embodiment of the wireless communication unit of FIG. 2.

FIG. 3 illustrates an embodiment of the wireless communication unit 30. The wireless communication unit 30 can comprise an antenna 32 and a wireless fidelity (WI-FI) module 36. The antenna 32 is electrically coupled to the WI-FI module 36. The WI-FI module 36 is configured to access the WLAN 200, and receive and transmit wireless signals through the antenna 32.

Figure 4:
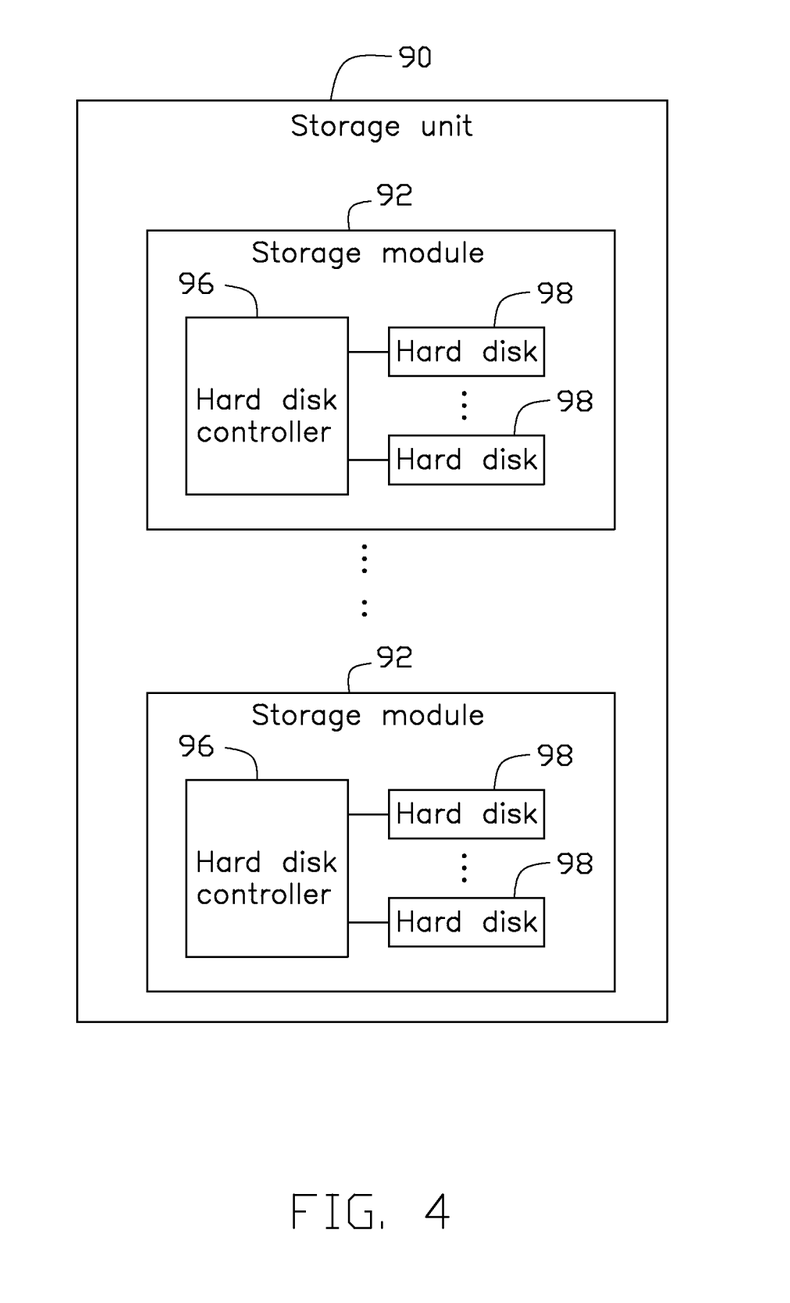
FIG. 4 is a block diagram of an embodiment of the storage unit of FIG. 2.

FIG. 4 illustrates an embodiment of the storage unit 90. The storage unit 90 can comprise a plurality of storage modules 92. Each storage module 92 can comprise a hard disk controller 96 and a plurality of hard disks 98 electrically coupled to the hard disk controller 96. Each hard disk controller 96 is electrically coupled to the control unit 20. The control unit 20 controls the hard disk controllers 96 to perform read and write operations of the hard disks 98. In at least one embodiment, each hard disk 98 can be a solid state device or a hard disk drive device.

Figure 5:
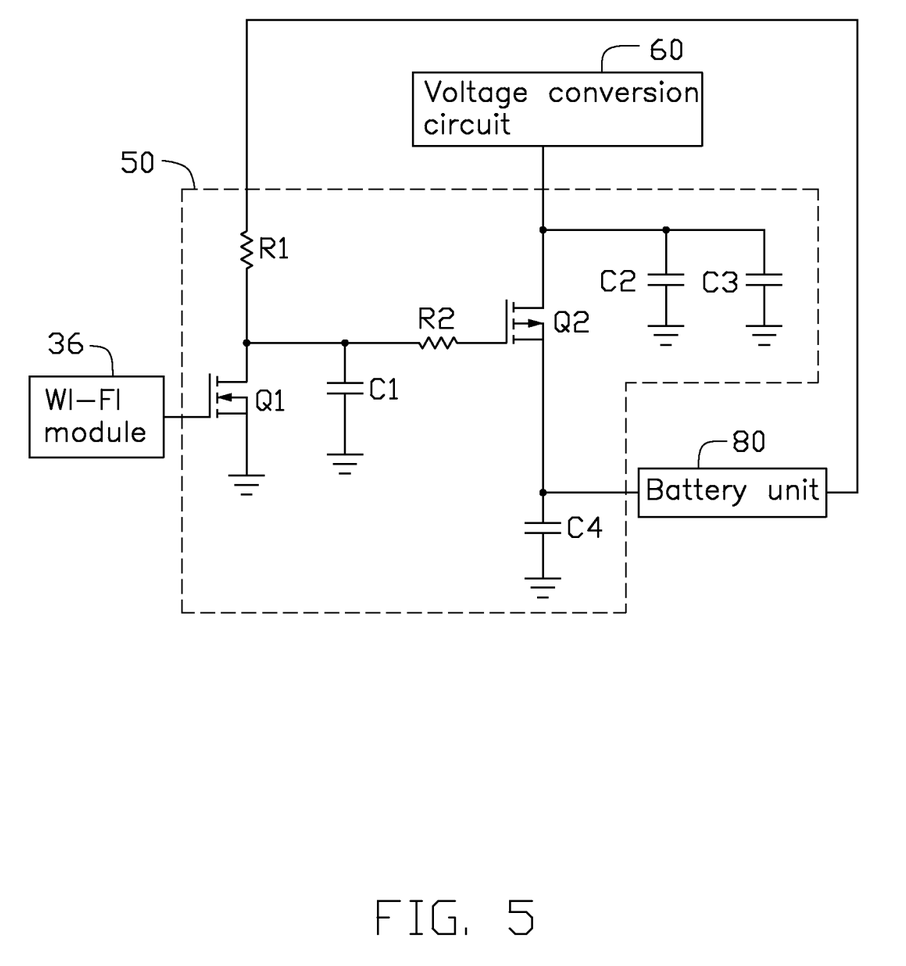
FIG. 5 is a circuit diagram of an embodiment of the switch unit of FIG. 2.

FIG. 5 illustrates an embodiment of the switch unit 50. The switch unit 50 can comprise two electronic switches Q1 and Q2, two resistors R1 and R2, and four capacitors C1-C4. Each of the electronic switches Q1 and Q2 can comprise a first terminal, a second terminal, and a third terminal. The first terminal of the electronic switch Q1 is electrically coupled to the WI-FI module 36. The second terminal of the electronic switch Q1 is electrically coupled to the battery unit 80 through the resistor R1 to receive the voltage from the battery unit 80, and is electrically coupled to ground through the capacitor C1. The third terminal of the electronic switch Q1 is electrically coupled to ground. The first terminal of the electronic switch Q2 is electrically coupled to the second terminal of the electronic switch Q1 through the resistor R2. The second terminal of the electronic switch Q2 is electrically coupled to the voltage conversion circuit 60, electrically coupled to ground through the capacitor C2, and electrically coupled to ground through the capacitor C3. The third terminal of the electronic switch Q2 is electrically coupled to the battery unit 80 to receive the voltage from the battery unit 80, and is electrically coupled to ground through the capacitor C4.

In at least one embodiment, the electronic switch Q1 can be an n-channel metal-oxide semiconductor field-effect transistor (NMOSFET), and the first terminal, the second terminal, and the third terminal of the electronic switch Q1 correspond to a gate, a drain, and a source of the NMOSFET, respectively. The electronic switch Q2 can be a p-channel metal-oxide semiconductor field-effect transistor (PMOSFET), and the first terminal, the second terminal, and the third terminal of the electronic switch Q2 correspond to a gate, a drain, and a source of the PMOSFET, respectively. In other embodiments, the electronic switch Q1 can be an npn-type bipolar junction transistor (BJT) or other suitable switch having similar functions, and the electronic switch Q2 can be a pnp-type BJT or other suitable switch having similar functions.

When a user wants to use the NAS device 100 through the terminal device 300, a WLAN module or a WI-FI module of the terminal device 300 is turned on. A pairing between the WLAN module or the WI-FI module of the terminal device 300 and the WI-FI module 36 of the NAS device 100 is performed through the WLAN 200. After pairing, the WLAN module or the WI-FI module of the terminal device 300 transmits a signal as a request to access the storage unit 90. After receiving the request, the WI-FI module 36 outputs a high level signal (that is, the first control signal), such as logic 1, to the first terminal of the electronic switch Q1, and the electronic switch Q1 is turned on. The second terminal of the electronic switch Q1 outputs a low level signal, such as logic 0, to the first terminal of the electronic switch Q2, and the electronic switch Q2 is turned on. The battery unit 80 powers the voltage conversion circuit 60 through the electronic switch Q2. The voltage conversion circuit 60 converts the voltage supplied by the battery unit 80 into operation voltages of the control unit 20 and the storage unit 90, to supply power to the control unit 20 and the storage unit 90, and the control unit 20 and the storage unit 90 begin to operate.

When the control unit 20 determines that the terminal device 300 needs to write data into the NAS device 100, the control unit 20 controls the wireless communication unit 30 to receive data from the terminal device 300, and transmits the data to the hard disk controllers 96. Each hard disk controller 96 detects remaining memory space of each hard disk 98 electrically coupled to the hard disk controller 96, and writes the data to corresponding hard disks 98, according to the remaining memory space of each hard disk 98.

When the control unit 20 determines that the terminal device 300 needs to read data from the NAS device 100, the control unit 20 controls the hard disk controllers 96 to read the data needed by the terminal device 300 from the hard disks 98, outputs the read data to the wireless communication unit 30, and controls the wireless communication unit 30 to transmit the read data to the terminal device 300 through the WLAN 200.

As long as the WI-FI module 36 does not receive a request to access the storage unit 90 from the terminal device 300, the WI-FI module 36 outputs a low level signal (that is, the second control signal), such as logic 0, to the first terminal of the electronic switch Q1, and the electronic switch Q1 is turned off. The second terminal of the electronic switch Q1 outputs a high level signal, such as logic 1, to the first terminal of the electronic switch Q2, and the electronic switch Q2 is turned off. The battery unit 80 cannot power the voltage conversion circuit 60 through the electronic switch Q2, and the voltage conversion circuit 60 cannot supply power to the control unit 20 and the storage unit 90. Therefore, electrical energy is saved.

As detailed above, until the WI-FI module 36 receives a request to access the storage unit 90, the WI-FI module 36 outputs the second control signal to keep the switch unit 50 turned off. The battery unit 80 cannot power the voltage conversion circuit 60, and the voltage conversion circuit 60 cannot supply power to the control unit 20 and the storage unit 90. Therefore, the wireless communication system 1000 with the NAS device 100 can save electrical energy.

The embodiment shown and described above is only an example. Many details are often found in the art such as the other features of the wireless communication system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiment described above may be modified within the scope of the claims.

What is claimed is:

1. A network attached storage (NAS) device comprising:
a storage unit configured to store data;
a wireless controller configured to receive and transmit wireless signals;
a control unit electrically coupled to the storage unit and the wireless controller;
a switch unit electrically coupled to the wireless controller and configured to receive a first control signal and a second control signal from the wireless controller;
wherein the switch unit comprises:
a first resistor;
a first electronic switch comprising a first terminal electrically coupled to the wireless controller to receive the first control signal and the second control signal, a second terminal electrically coupled to the battery through the first resistor to receive the voltage of the battery, and a third terminal electrically coupled to ground; and
a second electronic switch comprising a first terminal electrically coupled to the second terminal of the first electronic switch, a second terminal electrically coupled to the voltage conversion circuit, and a third terminal electrically coupled to the battery to receive the voltage of the battery;

a battery electrically coupled to the wireless controller and the switch unit, and configured to power the wireless controller and the switch unit; and a voltage conversion circuit electrically coupled to the switch unit, the control unit and the storage unit;

wherein in the event that the wireless controller receives a request to access the storage unit, the wireless controller is configured to output the first control signal to the switch unit, causing the switch unit to be activated; the battery unit is configured to power the voltage conversion circuit through the switch unit; and the voltage conversion circuit is configured to convert a voltage of the battery unit into operation voltages of the control unit and the storage unit, thereby supplying power to the control unit and the storage unit; and wherein in the event that the wireless controller does not receive the request, the wireless controller is configured to output the second control signal to the switch unit, thereby causing the switch unit to be deactivated, preventing the battery unit from supplying power to the voltage conversion circuit, and the voltage conversion circuit is configured to not supply power to the control unit and the storage unit.

2. The NAS device of claim 1, wherein in the event that the first terminal of the first electronic switch receives the first control signal, the first electronic switch is turned on, the second electronic switch is turned on, and the battery powers the voltage conversion unit through the second electronic switch; and wherein in the event that the first terminal of the first electronic switch receives the second control signal, the first electronic switch is turned off, the second electronic switch is turned off, and the battery cannot power the voltage conversion unit through the second electronic switch.

3. The NAS device of claim 2, wherein the switch unit further comprises a second resistor, a first capacitor, a second capacitor, and a third capacitor, the second terminal of the first electronic switch is electrically coupled to the first terminal of the second electronic switch through the second resistor, and is electrically coupled to ground through the first capacitor, the second terminal of the second electronic switch is electrically coupled to ground through the second capacitor, and the third terminal of the second electronic switch is electrically coupled to ground through the third capacitor.

4. The NAS device of claim 2, wherein the wireless controller comprises an antenna and a wireless fidelity (WI-FI) module, the WI-FI module is electrically coupled to the antenna and the first terminal of the first electronic switch, the WI-FI module is configured to access a wireless local area network, and receive and transmit wireless signals through the antenna; the WI-FI module outputs the first control signal to the first terminal of the first electronic switch, in event that the WI-FI module receives the request; and the WI-FI module outputs the second control signal to the first terminal of the first electronic switch, in event that the WI-FI module does not receive the request.

5. The NAS device of claim 1, wherein the storage unit comprises a plurality of storage modules, each storage module comprises a hard disk controller and a plurality of hard disks electrically coupled to the hard disk controller, each hard disk controller is electrically coupled to the control unit, the control unit controls the hard disk controllers to perform read and write operations of the hard disks.

6. A wireless communication system comprising:

a terminal device;

a wireless local area network (WLAN); and a network attached storage (NAS) device configured to communicate with the terminal device through the WLAN, the NAS device comprising:

a storage unit configured to store data;

a wireless controller configured to access the WLAN and receive and transmit wireless signals;

a control unit electrically coupled to the storage unit and the wireless controller;

a switch unit electrically coupled to the wireless controller and configured to receive a first control signal and a second control signal from the wireless controller; wherein the switch unit comprises:

a first resistor;

a first electronic switch comprising a first terminal electrically coupled to wireless controller to receive the first control signal and the second control signal, a second terminal electrically coupled to the battery through the first resistor to receive the voltage of the battery, and a third terminal electrically coupled to ground; and a second electronic switch comprising a first terminal electrically coupled to the second terminal of the first electronic switch, a second terminal electrically coupled to the voltage conversion circuit, and a third terminal electrically coupled to the battery to receive the voltage of the battery;

a battery electrically coupled to the wireless controller and the switch unit, and configured to power the wireless controller and the switch unit; and a voltage conversion circuit electrically coupled to the switch unit, the control unit and the storage unit;

wherein in the event that the wireless controller receives a request to access the storage unit from the terminal device, the wireless controller is configured to output the first control signal to the switch unit, causing the switch unit to be activated; the battery is configured to power the voltage conversion circuit through the switch unit; and the voltage conversion circuit is configured to convert a voltage of the battery into operation voltages of the control unit and the storage unit, thereby supplying power to the control unit and the storage unit; and wherein in the event that the wireless controller does not receive the request, the wireless controller is configured to output the second control signal to the switch unit, thereby causing the switch unit to be deactivated, preventing the battery from supplying power to the voltage conversion circuit; and the voltage conversion circuit is configured to not supply power to the control unit and the storage unit.

7. The wireless communication system of claim 6, wherein in the event that the first terminal of the first electronic switch receives the first control signal, the first electronic switch is turned on, the second electronic switch is turned on, and the battery powers the voltage conversion unit through the second electronic switch; and wherein in the event that the first terminal of the first electronic switch receives the second control signal, the first electronic switch is turned off, the second electronic switch is turned off, and the battery cannot power the voltage conversion unit through the second electronic switch.

8. The wireless communication system of claim 7, wherein the switch unit further comprises a second resistor, a first capacitor, a second capacitor, and a third capacitor, the second terminal of the first electronic switch is electrically coupled to the first terminal of the second electronic switch through the second resistor, and is electrically coupled to ground through the first capacitor, the second terminal of the second electronic switch is electrically coupled to ground through the second capacitor, and the third terminal of the second electronic switch is electrically coupled to ground through the third capacitor.

9. The wireless communication system of claim 7, wherein the wireless controller comprises an antenna and a wireless fidelity (WI-FI) module, the WI-FI module is electrically coupled to the antenna and the first terminal of the first electronic switch, the WI-FI module is configured to access the WLAN, and receive and transmit wireless signals through the antenna; the WI-FI module outputs the first control signal to the first terminal of the first electronic switch, in event that the WI-FI module receives the request; and the WI-FI module outputs the second control signal to the first terminal of the first electronic switch, in event that the WI-FI module does not receive the request.

10. The wireless communication system of claim 6, wherein the storage unit comprises a plurality of storage modules, each storage module comprises a hard disk controller and a plurality of hard disks electrically coupled to the hard disk controller, each hard disk controller is electrically coupled to the control unit, the control unit controls the hard disk controllers to perform read and write operations of the hard disks.

* * * * *